United States Patent [19]

Jensen

[11] 4,121,767

[45] Oct. 24, 1978

[54] MOBILE AGRICULTURAL SPRAYER WITH ADDITIVE CONCENTRATION CONTROL

[76] Inventor: Richard Jensen, Star Rte. 176, McCammon, Id. 83250

[21] Appl. No.: 708,544

[22] Filed: Jul. 26, 1976

[51] Int. Cl.$^2$ .................. B05B 7/26; G05D 11/08
[52] U.S. Cl. .................. 239/71; 137/92; 137/93; 239/124; 239/156; 239/307; 239/308; 239/310
[58] Field of Search .................. 239/61, 71–74, 239/124, 156, 171, 172, 303–305, 307, 308, 310, 317, 318; 137/88, 92, 93

[56] References Cited

U.S. PATENT DOCUMENTS

| | | | |
|---|---|---|---|
| 3,223,108 | 12/1965 | Martz, Jr. | 137/93 |
| 3,299,787 | 1/1967 | Kolb et al. | 137/93 X |
| 3,770,198 | 11/1973 | Mihara | 239/310 X |
| 3,771,542 | 11/1973 | Williams | 137/93 |
| 3,784,100 | 1/1974 | Kirschmann | 239/172 X |
| 3,865,308 | 2/1975 | Pringle et al. | 239/61 |

Primary Examiner—Evon C. Blunk
Assistant Examiner—Andres Kashnikow
Attorney, Agent, or Firm—Trask & Britt

[57] ABSTRACT

A mobile agricultural sprayer having a control system for controlling the amount of chemical additive added to a water stream from a mobile storage tank in response to a chemical additive concentration detector is disclosed. The mobile sprayer utilizes a mobile water storage tank and at least one chemical additive tank which communicates with the water to be sprayed at a point between the tank and the sprinkler heads. A pump draws water from the storage tank and directs it under pressure to the sprinkler heads. The chemical additive is typically added in liquid form, such as a solution or a slurry, at a point preferably upstream of the pump inlet while concentration is measured at a point between the point of addition of the chemicals and the sprinkler heads and preferably before the inlet of the pump. The concentration detector transmits information to a monitor which controls the amount of chemical introduced into the water to be sprayed.

13 Claims, 5 Drawing Figures

MOBILE AGRICULTURAL SPRAYER WITH ADDITIVE CONCENTRATION CONTROL

BACKGROUND OF INVENTION

1. Field

The field of invention involves mobile agricultural sprinklers utilized for spraying fruit trees and various truck farm crops for controlling weeds. The mobile agricultural sprinklers are generally drawn behind a tractor or other device and carry a tank of the solution or slurry to be sprayed. The mobile sprinklers may also be airborne.

2. Prior Art

Mobile sprinklers for agricultural purposes such as spraying fruit trees and truck farm crops have been known and utilized in the agricultural field for some time. Generally, the material to be sprayed is added directly to a storage tank which is placed on a wheeled frame and towed behind a tractor or other propulsion device.

Some of the sprinkling apparatus for adding solutions of chemicals to fruit trees, crops and for weed control utilize a holding tank for water and a separate tank for chemicals wherein the flow rate of chemicals into the water spray system is regulated by the forward speed of the sprayer.

A system having a ground speed correlation is disclosed in Krischmann, U.S. Pat. No. 3,784,100 wherein the concentration remains the same but the flow rate is correlated with the ground speed of the sprinkling system.

Also, in Mihara, U.S. Pat. No. 3,770,198, a sprinkling system is disclosed, which appears to be a fixed sprinkling system utilizing a head tank for water storage wherein the concentration of chemical additive is added to the system depending upon the respective flow rates of the water supply and the chemical additive supply. Mihara utilizes a pressure balance between the water stream and the chemical stream to determine the proportions of each introduced to the spray heads. Further, an emergency system whereby the concentration is detected by other than flow or pressure means is utilized for stopping the chemical stream flow if the system malfunctions. The Mihara system bases its control primarily on a shut-down system whenever the chemical concentration exceeds a certain level. Otherwise, Mihara uses the respective pressures of the water stream and the chemical additive stream to determine the proportions of each to be admixed to be sent to the spray heads.

OBJECTS OF THE INVENTION

It is an object of the invention to provide a mobile chemical spray apparatus which preserves the storage tank in an uncontaminated condition.

It is a further object of the instant invention to provide a mobile chemical spray apparatus having an accurate chemical concentration control system.

Another object of the invention is to provide instant selection and change of the chemical being sprayed.

A further object of the instant invention is to provide a chemical concentration control system which may be mounted upon existing mobile spray apparatus.

Another object of the instant invention is to provide an incremental chemical additive system having a visual and audio signal to indicate pump failure.

A further object of the invention is to provide a mobile agricultural spray system wherein the chemical concentration may be substantially instantaneously changed.

DESCRIPTION OF INVENTION

A unique mobile spray apparatus for applying solutions of chemicals to orchards, truck farm crops and to weeds has been developed. The mobile sprayer comprises a mobile agricultural frame supporting a storage tank which is connected to the inlet of a pump. Sprinkler heads communicate with the outlet of the pump and at least one chemical additive tank communicates with the water system at a point between the tank and the sprinkler heads. A chemical concentration monitor monitors the chemical concentration at a point between said chemical addition point and the sprinklers and valve means is provided to control the quantity of chemical additive flowing into the water flow in response to signals from the monitoring device. A flow by-pass is provided to provide a substantially constant water pressure at the spray heads.

The system is especially advantageous inasmuch as the chemical additive tank, pump and concentration detection monitoring and control devices can be added to an existing mobile sprinkler apparatus having a tank, a pump, and spray heads.

The mobile agricultural device in more sophisticated form comprises a water tank on a wheeled frame, a pump having its inlet communicating with the discharge of said water storage tank with a check valve between said pump inlet and the storage tank to prevent backflow into the tank. An electro-conductance cell to determine electro-conductivity of a solution flowing into the pump inlet is located in the line to the pump inlet while the chemical additive tank communicates with the water conduit between the check valve and the electro-conductance cell. An electro-conductivity monitor device is connected to the electro-conductance cell and has control means to generate output signals to control a valve in the chemical additive line between the chemical tank and the addition point to the water conduit, said valve means acting in response to signals from the electro-conductance monitor. The discharge of a pump passes through a pressure regulating device which recirculates a portion of the stream, if the pressure is too high, to the water supply line at a point between the check valve and the electro-conductance cell. It is important to maintain a substantially constant pressure of liquid to the spray heads to maintain the proper spray pattern.

Figure 1:
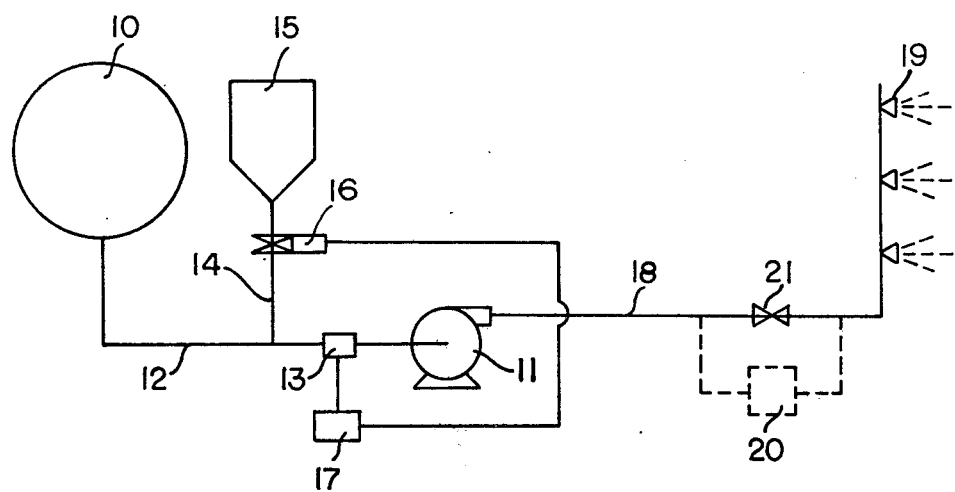
FIG. 1 is a schematic view of a simplified mobile chemical spray apparatus having concentration control means.

The description of the illustrated embodiment may be facilitated by reference to the drawings. In FIG. 1 a simplified version of the invention is schematically illustrated wherein a storage tank 10 is connected to a pump 11 by a water supply conduit having an electro-conductance cell 13 located immediately prior to the pump. At a point between the storage tank 10 and the electro-conductance cell the discharge line 14 from a chemical additive tank 15 innerconnects with the water supply line 12. A control valve 16 controls the flow of chemical additive into the water supply line in response to signals from a concentration monitor 17 which is interconnected with the conductance cell 13. The discharge from the pump passes through the discharge line 18 to the spray heads 19. It is preferred that a constant pressure be maintained at the spray heads so that a constant pressure discharge pump is preferably utilized.

The chemical additive is preferably added to the solution in liquid form with the chemical additive tank pressurized so that the chemical is added under pressure without requiring an additional pump and avoiding the surging which results from a pump. A rotary pump with a recirculating line may, however, be utilized. Optionally, a surge tank may be inserted between the discharge of the pump and the spray heads, as shown in the dotted lines 20 so that any variations in concentration may be averaged by holding the discharge of the pump in a surge tank for a few moments. Closing valve 21 causes the solution to flow through the surge tank before discharging to the sprinkler heads 19.

The addition of chemical additives to a water system causes a slight change in the electro-conductivity of the water. The change in electro-conductivity is detected by electro-conductance cell 13 and an increase in electro-conductivity indicates an increase in chemical additive. The monitor 17 may be set so that a desired electro-conductivity of the solution will be substantially maintained. If the electro-conductivity of the chemical additive-water solution passes through the electro-conductance cell increases then the monitor 17 closes valve 16 for a short duration to lower the electro-conductivity. If the electro-conductivity is too low then the valve 16 is opened to allow more chemical additive to enter the system. Since there may be some fluctuation in the operation of the valve, the optional surge tank tends to average these slight variations in concentration of the solution so that the solution sprayed through the spray heads 19 has a substantially constant concentration of chemical additive in the water solution.

Figure 2:
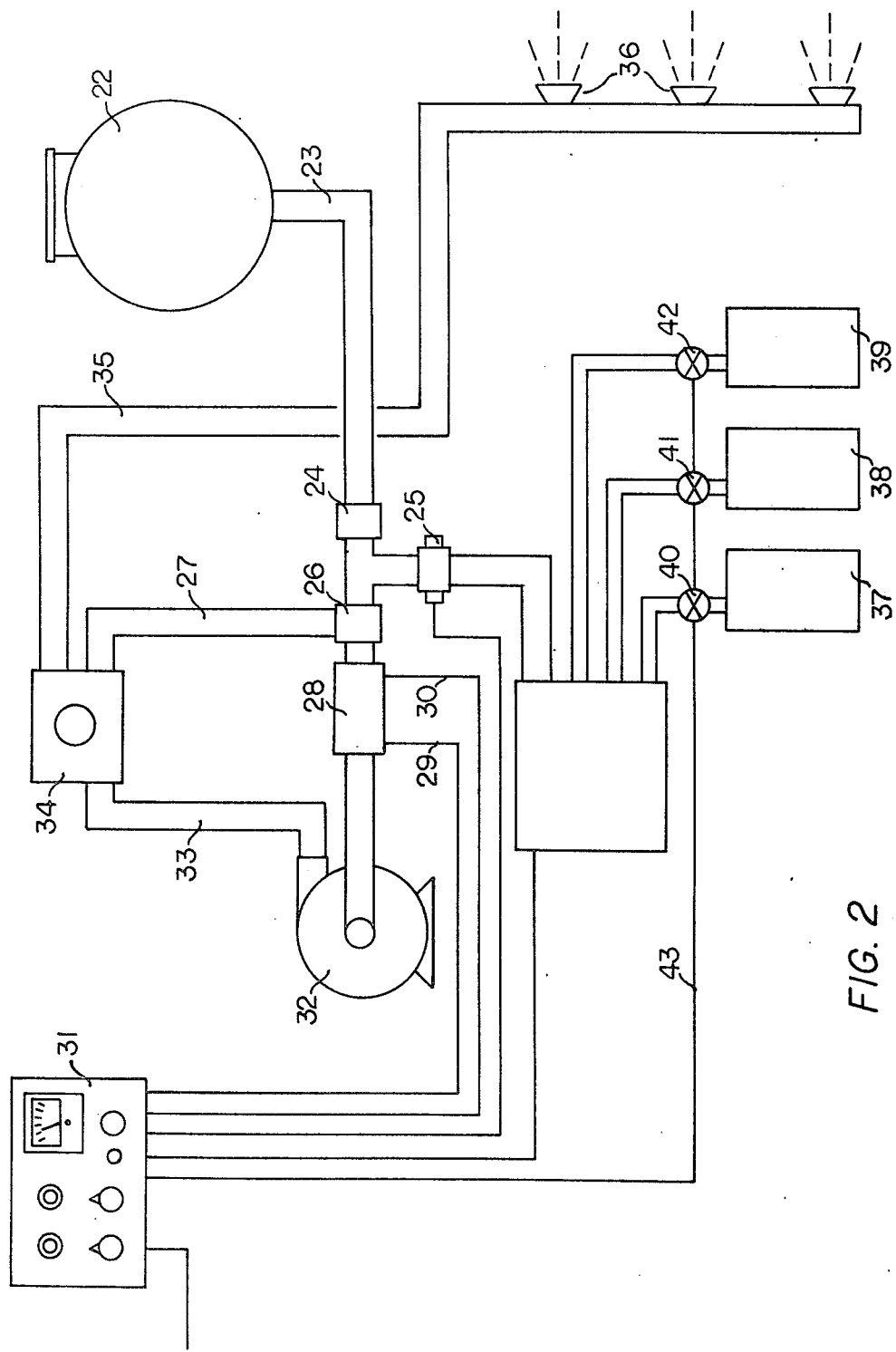
FIG. 2 is a schematic view of a mobile chemical spray apparatus having refined control and recycle means.

FIG. 2 illustrates a particularly preferred embodiment of the instant invention wherein the storage tank 22 discharges into a line 23 in which a check valve 24 is placed between the pump and the storage tank and between the inlet of the chemical solution and the sotrage tank so that the chemical solution cannot return to the storage tank.

Concentrated chemical solution is introduced into the water stream through solenoid valve 25. The concentrated chemical solution is introduced through a mixing chamber 26 into which a recycle stream 27 also flows. The chemical solution then flows through the electroconductance cell 28. The electrodes of the conductance cell are connected to lines 29 and 30 to the monitor control 31. The chemical solution then flows through pump 32 and passes through line 33 to a regulating valve 34 which determines the pressure of the solution passing into line 35 which feeds sprinklers 36. Since it is desired to have a constant pressure of liquid on sprinklers 36, the regulator valve 34 is set so that the same pressure of fluid is always introduced into line 35. To avoid undue back pressure on pump 32 a portion of the stream 33 is diverted in regulatory valve 34 into recycle line 27. This also has the effect of enhancing the consistency of chemical concentration in the liquid passing through the conductance cell inasmuch as the recycling of a portion of the chemical solution to line 27 thus necessitates the addition of smaller amount of concentrated chemical solution into the mixing chamber 26. Thus, the conductance cell at any time will only be calling for slight additions of concentrated chemical solution so that any deviation from introducing a concentrated chemical solution would be minimized since the solution 27 being returned is near the desired concentration.

The concentrated chemicals are contained in one or more tanks, as illustrated by the three tanks 37, 38 and 39 in FIG. 2. The three tanks may contain different concentrated chemical solutions for different purposes, for example one may contain a pesticide, another a herbicide, while another may contain a blossom retardant. The concentrated chemical tanks 37, 38 and 39 may have valves 40, 41 and 42, which are solenoid valves connected to electrical conduit 43 to the monitor box so that any one of the three tanks may be remotely selected to introduce chemicals into the spray system.

Figure 3:
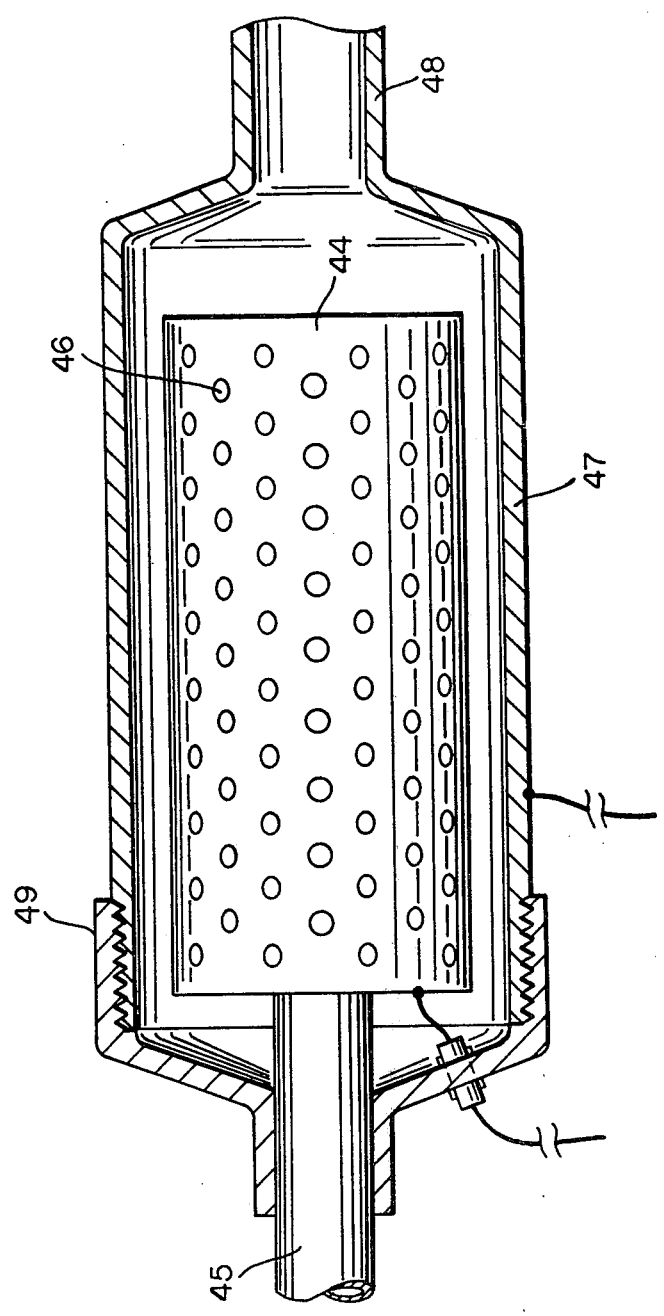
FIG. 3 is a sectional view of a preferred conductance cell for use in monitoring concentration of chemicals.

FIG. 3 is a conductance cell particularly useful in the instant invention. It has an internal electrode of copper or some other suitable highly conductive metal 44 having good corrosion resistance. The electrode is preferably in the shape of a canister, that is it has a hollow tubular opening 45 through which the chemical solution flows into an expanded chamber to discharge through the pores 46 into the annular cavity between the outer surface of electrode 44 and the inner surface of electrode 47. Electrode 47 is also a canister shape having an expanded tubular section which encircles the inner electrode 44 and necks down to a discharge section to discharge the chemical solution through the tubular portion 48. Electrode 47 is electrically isolated from electrode 44 through the use of an electrically non-conductive cap 49 which is sealed around tube 45 and screws onto electrode 47 to form a liquid seal. Cap 49 may be made of hard rubber, plastic, ceramic, glass or other non-electrically conductive corrosion-resistant material.

The conductance cell of this invention is particularly useful inasmuch as it has an expanded surface area for each electrode. The concentric cylinder construction and porous inner cylinder facilitates the expansion of electrode surface. The inner canister electrode 44 has a length preferably from about 2 inches to about 6 inches and a diameter of about 1 to about 2 inches with about 1½ inches diameter preferred. The outer electrode 47 has a length slightly longer than the inner electrode and an inner diameter which is about 178 inch greater than the outer diameter of the inner electrode. The extended surface of the electrodes provides a more sensitive conductance cell which is particularly desirable inasmuch as the chemical solutions utilized as sprays are rather dilute and the detection of very slight changes in electro-conductivity is essential to monitor properly and control the concentration of chemical in the solution.

The concentration of chemical in the water for many agricultural spray purposes is frequently less than about 2 percent and often in the range of about 1 percent or less. Thus, only a slight change in the electro-conductivity of a solution may result from a doubling of the concentration. Even a doubling of the conductance is often difficult to detect because the voltage passed is so low. Such an event would either have a deleterious effect upon the crops being sprayed or result in a waste of expensive chemical solutions. Therefore, it is necessary to be able to monitor very slight changes in electro-conductivity so that the chemical concentration can be maintained at the desired level within a range of plus or minus 5%.

A further feature of the unique conductance cell illustrated in FIG. 3 which makes it more sensitive is the discharge of solutions through numerous small openings or pores 46 in the shell of the inner electrode. This prevents striation but also provides a uniformly mixed solution without substantial turbulence.

The instant spray device is operated by charging the storage tank with a clean water. The chemical tank or tanks are then charged with an appropriate chemical solution in concentrated form. The system is energized after the spray apparatus becomes mobile. The system can also be energized in a standing position to accommodate hand spraying. Water is then drawn from the storage tank through the pump and concentrated chemical solution is injected into the water stream preferably immediately before the pump so that it is thoroughly mixed as it passes through the pump. The chemical solution is preferably placed under pressure so that there is no need to have an additional pump to inject the concentrated chemical solution into the water stream.

The electro-conductance of the chemical solution is monitored and compared with a preset electrical signal. Whenever the electrical conductance exceeds that of the preset signal the solenoid valve controlling flow of concentrated chemical into the water stream is closed. Whenever the concentration of chemical solution in the water drops, the electro-conductivity drops and the valve is opened to introduce more chemical.

A further electrical signal is generated by a small AC generator or other signal producing device attached to the wheels of the sprayer so that as the sprayer increases or decreases speed the output, i.e., frequency for an AC generator, of the signal producing devices increases or decreases proportionately to the increase or decrease in speed. The signal from the speed control can be converted to a millivolt signal proportional to the speed increase or decrease and introduced into the standard signal to which the signal from the electro-conductance cell is compared. The increase or decrease of the standard signal causes an increase or decrease in the amount of chemical introduced into the water stream.

An alternate signal producing means for detecting ground speed change comprises a light emitting diode attached to revolve with one of the sprayer wheels and a light sensitive counter to sense rpm and convey such information to a converter to convert such information to a signal affecting the standard signal against which the electro-conductance cell signal is compared.

If, through any malfunction, the chemical solution ceases to be fed so that concentration drops, a horn is sounded and a light flashes to indicate either a plugged pump or defective valve or an empty chemical solution tank.

The sprinkling system of the instant invention is particularly advantageous inasmuch as no chemical solution is ever introduced into the main storage tank. Further, one or more chemical solutions can be carried and applied at a time so that during one trip into a crop area the crops may be sprayed against various insects and disease and fertilized. Adjoining areas can also be sprayed with herbicides to maintain weed control. Also, the system is designed to offer a very accurate control of the chemical concentration.

Figure 4:
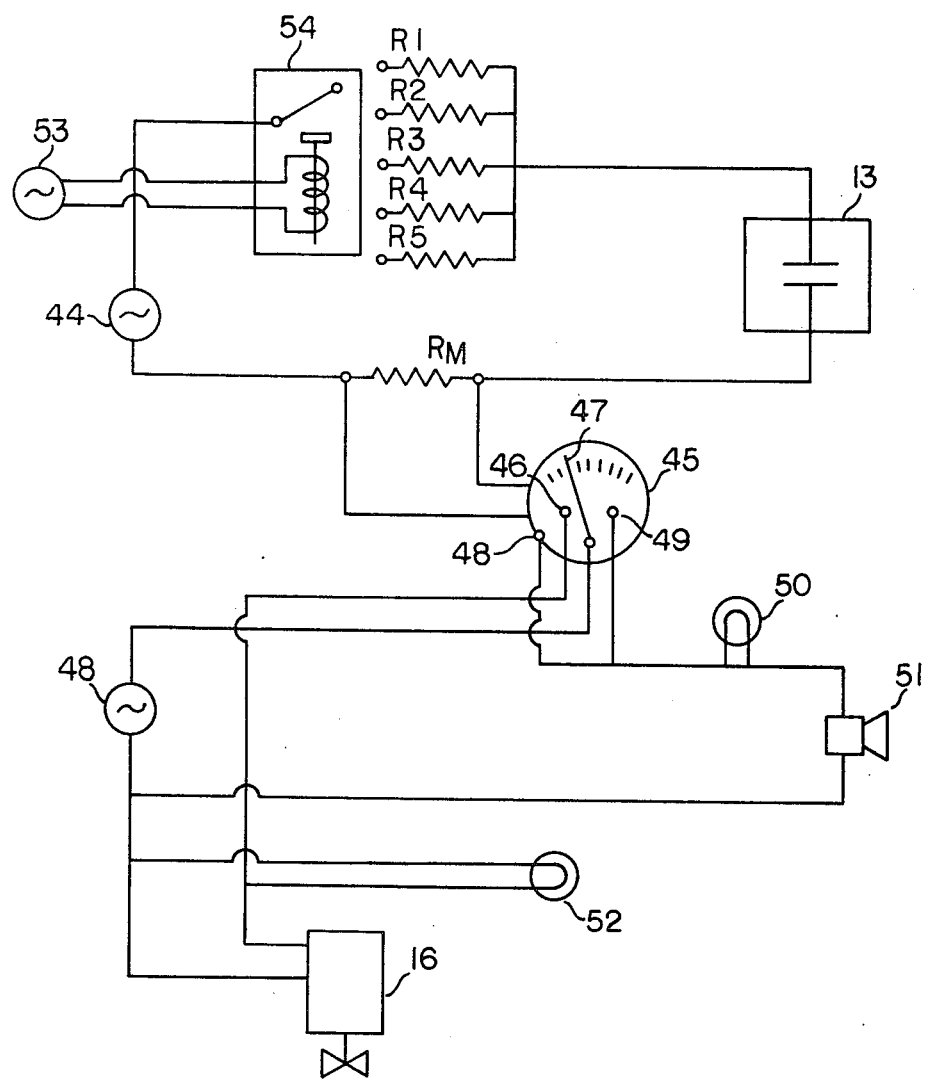
FIG. 4 is a schematic of the concentration monitor control system.

The schematic of FIG. 4 illustrates a basic circuit diagram for the agricultural sprayer of the instant invention.

A power source 44, DC or AC current, although a DC current is generally preferred, provides current to the conductance cell. The power source may be provided from the electrical system of a tractor or from a generator or alternator driven from the tractor's power take-off. As the resistance of the conductance cell 13 varies, the voltage across it varies, which causes different readings on meter 45.

Meter 45 (illustrated for a DC current) can be zeroed so that the meter can be set on zero for any water or chemical system. This is important since mineral content and temperature affect the conductivity of water. Thus, the water or chemical (i.e, fertilizer spray, etc.) to be sprayed is passed through the conductance cell and the meter is set to read zero.

The meter is equipped with an electrical contact system whereby the range of concentration can be preset. The millivolt reading of a desired concentration for a particular chemical is predetermined. Since the millivolt deviation for a minor change in concentration may be very small and difficult to detect with a typical millivolt meter, the amplification of the signal from the conductance cell to the meter may be desirable. The contact point 46 is moved so that it is set at the desired concentration. The needle 47 is connected to one terminal of a power source 48 while the other terminal of the power source, which may be an AC or DC source, is connected to solenoid valve 16. Contact 46 and needle 47 form a switch which energizes the solenoid to open the valve introducing concentrated liquid chemicals into the water stream. Needle 47 maintains contact with contact 46 even below the desired concentration level. However, as needle 47 advances above the desired concentration level, the electrical connection is opened and solenoid valve 16 closes.

In the event of a malfunction, alarm contacts 48 and 49 are provided as contacts for needle 47. In a malfunction such as a frozen solenoid valve in the open position, which causes an excessive chemical concentration in the spray solution, the needle would contact excess concentration alarm contact 49 which is interconnected to an alarm light 50 and horn 51 to indicate to the operator that a malfunction had occurred.

If the solenoid valve ceases to open, the chemical concentration in the spray solution will drop until dilute concentration contact 48 is contacted by needle 47, again causing light 50 and horn 51 to be activated.

Another technique for activating the sonic and visual alarm is to provide a time-sequence sensor wherein the alarm is operated if the concentration control does not detect a change in concentration within a pre-set time period. Also, the time sensor can be used to sound an excess concentration alarm if control unit does not call for additional chemical feed within a pre-set period.

Since the rate of water spray is known, the approximate rate of feed of chemical can be readily calculated to achieve a certain predetermined concentration. The rate of chemical flowing through the feed valve for a given plunger thrust can be determined at a certain chemical pressure. Thus, the number of times the valve opens during a given period of time can be calculated and the time interval, with a safety margin, can be set in the time sensor so that the alarm is sounded by too frequent or too infrequent openings of the chemical feed valve.

A further operation monitor is provided by light 52 which will illuminate each time solenoid 16 is energized. Thus, light 52, which along with the other monitor lights may be a light emitting diode, will glow and darken intermittently. If it is constantly lit, or unlit, it is a preliminary indication of a malfunction, such as a dirty solenoid valve or inoperative by pass valve 34 (see FIG. 2).

The concentration of the spray is usually determined for an average ground speed of the sprayer, e.g., 4 miles an hour. The concentration is determined so that a certain quantity of chemical is applied per unit area of ground. Since ground speed can affect the chemical quantity/unit area, some compensation is desirable for ground speed so that the application of chemicals per unit area is substantially constant.

An input of ground speed to affect the rate of chemical addition to the water stream may be accomplished in several ways. One way is illustrated in FIG. 4 wherein a generator or alternator 53 is attached to the wheel or axle of the mobile sprayer. The signal from such a source is proportional to speed (proportional voltage from a generator, proportional frequency from an alternator) so that such signal may be utilized to affect the signal (current) passing through the conductance cell. FIG. 4 shows a stepping switch 54 wherein the switch puts into the conductance cell circuit one of five or more resistors, $R_1$, $R_2$, $R_3$, $R_4$, or $R_5$, wherein the resistance of each incrementally increases a fixed amount between each resistor from $R_1$ through $R_5$. Thus, at the predetermined average ground speed, resistor $R_2$ may be desired in the circuit. For a given resistance of $R_2$, $R_1$ may be 25% less resistance while $R_3$ may be 25% greater resistance and $R_4$ and $R_5$ having 50% and 75% greater resistance than $R_2$. As ground speed increases, the stepping switch puts a higher resistance resistor into the circuit while for lower ground speeds, the stepping switch puts less resistance into the circuit.

The introduction of a greater resistance into the circuit has the effect of decreasing the voltage across Rm (the meter resistor), which, in effect, gives the appearance of a lower conductivity in the conductance cell, to wit, a lower chemical concentration. The needle 47 will therefore contact contact 46 to open solenoid valve 16 to introduce more chemical into the system. Thus, the actual concentration of chemical in the spray is increased as a result of increased ground speed.

In the example given, $R_3$ may be considered the normal resistance for the desired ground speed. In the event ground speed is reduced below normal, $R_1$ may be introduced to decrease concentration below a normal amount.

The switching of various magnitude resistors into the conductance cell circuit may be done manually. The monitor unit containing meter 45, warning lights and operating switches is preferably located near the operator of the sprayer. For a tractor drawn sprayer, the monitor is preferably located on the tractor within the visual field of the driver. For manual introduction of resistances into the conductance cell circuit a panel of switches may be provided with a label indicating which switch should be turned on for a given ground speed.

The regulating of the chemical feed to the water stream is an important aspect of this invention. To properly apply a solution of insecticide, berbicide, fertilizer or the like, by spray techniques, three factors must be observed:

(1) chemical concentration,
(2) ground speed of the sprayer, and
(3) liquid pressure at the spray heads.

Although the instant invention provides means to adjust chemical concentration to compensate for varying ground speeds, it is occasionally important to apply a given chemical at a set concentration. Since tractor and other vehicle speedometers are extremely inaccurate and difficult to read at the applicable ground speed, 4 to 10 miles per hour, the concentration meter itself may be used as a guide to ground speed by mounting same on the tractor where it may be observed. If a particular chemical should be applied at a given concentration, that concentration can be set into the meter through the applicable chart. The tractor operator would then watch the meter; if the meter shifted to a higher number the operator would know that the ground speed had increased, thereby increasing the concentration so as to maintain a uniform quantity application per unit area. The operator would then know to slow the tractor down until the meter again indicated the normal reading. The meter would also indicate a slow ground speed by dropping to a lower reading.

The liquid pressure at the spray heads is maintained at the correct level by the by-pass valve. The correct concentration is maintained by the conductance cell, monitor and control.

More than one chemical can be fed simultaneously through the system. It is frequently desired to feed, for example, a herbicide and a fertilizer simultaneously. The system described in FIG. 2 may be utilized wherein each chemical tank has a solenoid valve associated therewith. The valves would be calibrated so that each chemical would be fed at its desired rate when the valves were held open for the same period of time. Thus, the exact ratio of the chemicals introduced into the water stream could be preset. The total concentration of both chemicals in solution could be determined from the respective charts for each chemical. The meter would then be zeroed for the water being used, then set to the desired meter reading for the total concentration.

Alternately, the same system could be used to add two or more chemicals by zeroing the system, adding one chemical to the water stream until the correct concentration was achieved as indicated by the meter reading, then adding the second chemical until the meter achieved a reading equal to the sum of the readings for each chemical if individually added to the water stream.

Figure 5:
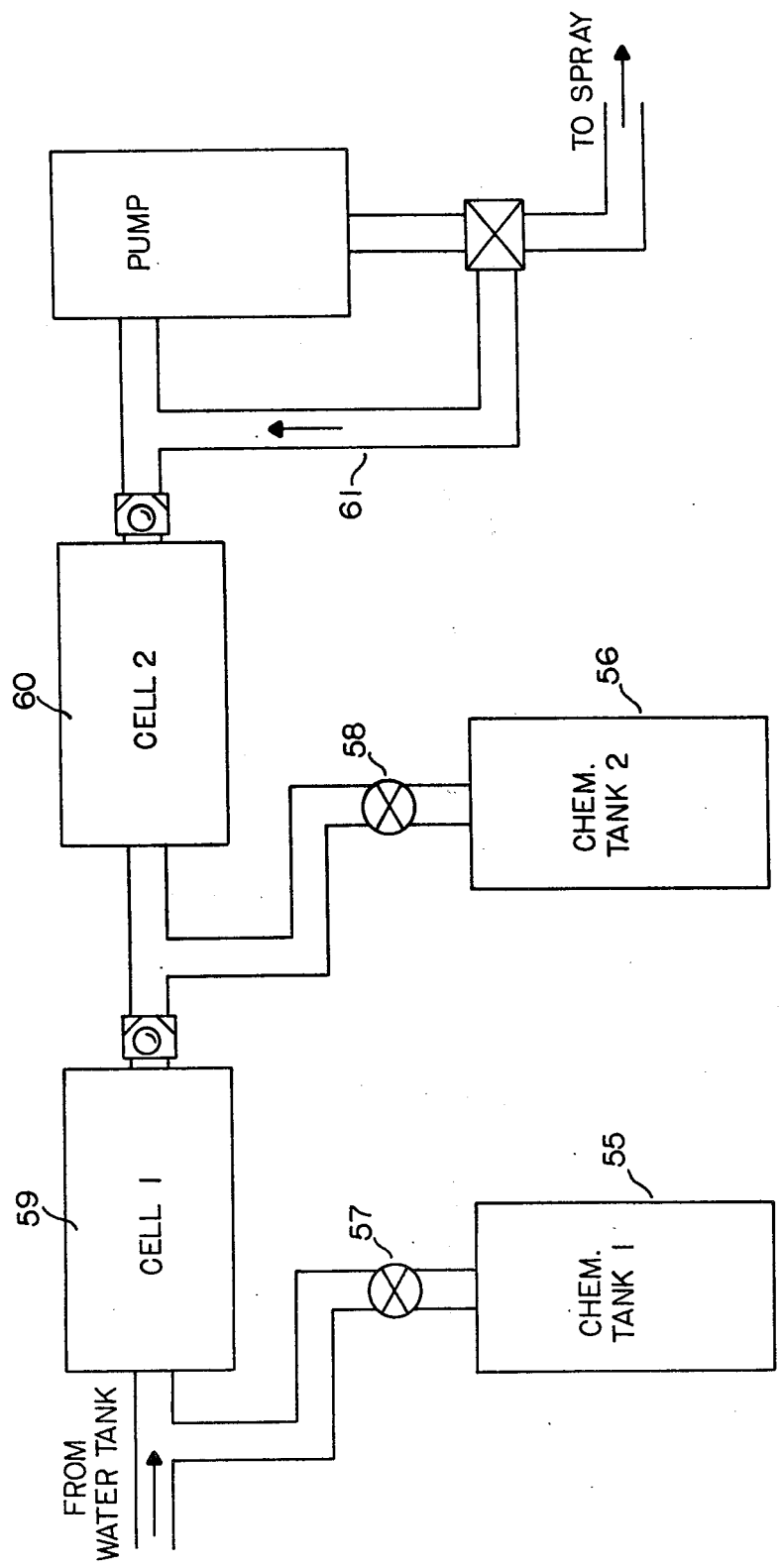
FIG. 5 is a schematic drawing illustrating a multichemical, mobile, spray apparatus.

A multiple chemical system is illustrated in FIG. 5 wherein two chemical tanks 55 and 56 were individually connected to the main water line through solenoid valves 57 and 58. Each chemical tank would feed into a separate conductance cell. Chemical no. 1 would be fed into the water stream after the meter for cell 59 had been zeroed. Each cell would be connected to its own meter and control. After chemical no. 1 had been introduced to the stream and the correct meter reading set for cell 59, chemical no. 2 would be fed and calibrated in the same way with the meter reading the sum of the usual meter reading for each chemical alone.

In the system illustrated in FIG. 5, the by-pass 61 does not flow through either conductance cell. The monitoring of the concentration of chemical no. 1 through cell 59 and the combination of chemicals through cell 60 assures that the proper ratio of chemicals is maintained in the solution and that the desired concentration of each is maintained.

A ground speed input is generally not required for an airborne sprayer inasmuch as there is less percentage change in ground speed application for a given aircraft. Thus, the system may be preset for the average application speed of the aircraft when it is installed.

For tractor drawn sprayers it is desirable to provide a ground speed input since the application speed may vary as much as 100%. Also, it is desirable to provide one unit for tractor operation which permits the unit to be adjusted or tuned to a particular tractor and a particular terrain.

The spray system of the instant invention is preferably provided as an essentially two-component adaptor for tractor drawn sprayers. Sprayers in the field and those being manufactured have a mobile water tank and pump. The instant system provides one component consisting of chemical feed solenoid valve, conductance cell, pump, by-pass and regular valve. A single chemical storage tank can be readily connected to this system. If a plurality of chemical tanks are to be used, a set of such tanks with intermediate valves is required for interfacing with the chemical feed solenoid valve.

The other main component is the monitor control box preferably mounted on the tractor. The monitor unit consists of the conductance meter, power supplies for the system, alarms (visual and sonic), operating switches, stepping switch (or other automatic adjustment device to provide ground speed input). If a ground speed control is used, a speed device is required for attachment to the axle or a wheel of the sprayer.

The unitized system is particularly useful inasmuch as it may be fit onto existing sprayers. Also, it simplifies installation.

Typical ionic chemicals useful in the instant invention include:

| Common Name | Chemically Active Ingredient | Trade Name |
|---|---|---|
| DCPA | Dimethyl-tetrachlors-terephthalic acid | Dacthal (Diamond Shamrock Co.) |
| Dalapon Plus TCA | Sodium salt of Dalapon plus TCA | Dowpon C (Dow Chemical Co.) |
| Dicamba | 3, 6-dichlora-O-anesic acid | Banvel (Velescol Co.) |
| TCA | Trechloracetic acid sodium salt | — |
| Picloram | 4-ameno-3, 5, 6-trechloro-picolinic acid | Tordon (Dow Chemical Co.) |
| MSMA | Monosodium acid methasrearsonate | Ansar 170 (Ansul Chemical Co.) |

Some existing chemicals for spray applications are non-ionic or are not available as a solution. Such chemical systems are not useful in the instant invention unless in the case of non-ionic solutions, some inert ionic agent is added.

The correlation between concentration and conductivity may be predetermined for any ionic chemicals to be used in the spray system. If desired, the conductance of the chemical solutions can be adjusted so that all the solutions to be sprayed have substantially the same conductance for the same concentration, or have substantially the same conductance for the usual concentration used in standard application. The adjustment of conductance can be accomplished by addition of inert ionic agents.

Certain chemical additives do not exhibit ionic properties in an aqueous medium. Ionic additives may be added, as heretofore suggested, or the concentration cell may be modified to determine concentration as a function of opacity, i.e., the more opaque the solution becomes, the greater is its concentration of chemical.

Opacity cells may be utilized substantially interchangeably with the electro-conductance cells heretofore described. A predetermined quantum of light is passed through the cell onto a photosensitive element which generates an electrical signal substantially proportional to the quantum of light received. As concentration of an aqueous solution increases, opaqueness increases, thereby causing a decrease in the electrical signal generated. Thus, the monitor must now function to decrease chemical flow in relation to a decreasing signal from the concentration cell. Otherwise, the system used for an electro-conductance concentration cell may be utilized.

A further advantage of the instant invention is provided by the introduction of chemical solution into the system by liquid head pressure (placing the chemical tanks high enough above the injection site to maintain a positive flow into the water stream), by pneumatic pressure in the chemical tank, by a chemical feed pump, or by a vacuum injector placed in the water stream line which draws the chemical into the water stream.

Although the invention has been described by reference to certain preferred embodiments, it is not intended to be limited solely thereto, but to include all the variations and modifications falling within the scope of the appended claims.

I claim:

1. A chemical concentration control unit for a mobile agricultural sprinkler having a storage tank and sprinkling heads comprising:

(a) a pump having an inlet connectable to said storage tank and an outlet connectible to said sprinkling heads;

(b) liquid conduit means connecting said pump to said storage tank and said sprinklers;

(c) at least one chemical additive tank communicating with said liquid conduit at a point between said storage tank and said pump;

(d) a concentration cell in said liquid conduit means located between the junction where said chemical additive tank communicates with said liquid conduit means and said pump, said concentration cell providing electrical signals in response to changes of concentration of liquids within the cell;

(e) a chemical concentration monitoring device which monitors the concentration of liquids flowing through said concentration cell and in response to changes in said concentration generates control signals;

(f) a chemical additive control valve means to control flow from said chemical additive tank into said liquid conduit means, said control valve opening and closing in response to signals from said monitoring device.

2. The chemical concentration control unit of claim 1 wherein a check valve is located in said liquid conduit means intermediate the junction of the chemical additive tank communication with said liquid conduit means and said storage tank to prevent liquid backflow into said storage tank.

3. The chemical concentation control unit of claim 1 wherein pump has a recycle bypass means and pressure control means at the discharge of said pump to recirculate various portions of the discharge flow of said pump to maintain a substantially constant liquiid pressure at said sprinkling heads.

4. The chemical concentration control unit of claim 3 wherein said pump recycle by-pass means recycles a portion of the pump outlet flow to a return to the inlet of the pump at a location upstream of said concentration cell.

5. The chemical concentration control unit of claim 1 wherein said concentration cell is an electro-conductance cell.

6. The chemical concentration control unit of claim 5 wherein said electro-conductance cell consists of cylindrical concentric electrodes of extended surfaces electrically isolated from one another.

7. The chemical concentration control unit of claim 1 wherein said monitor device has speed signal generating means to compensate for various ground speeds of the mobile sprayer.

8. The chemical concentration control unit of claim 7 wherein said speed signal generating means comprises manual introduction of an electrical bias in said electro-conductance cell monitoring circuit.

9. The chemical concentration control unit of claim 7 wherein said speed signal generating means comprises a ground speed detection device which introduces an electrical bias into said electro-conductance cell monitoring circuit.

10. The chemical concentration control unit of claim 1 wherein said chemical concentration monitoring device has a low and high concentration alarm.

11. A mobile agricultural sprinkler comprising:

(a) a water storage tank;
(b) a pump having its inlet communicating with the discharge of said water storage tank;
(c) a check valve between said pump inlet and said water storage tank to prevent back flow into said tank;
(d) a concentration cell to determine the concentration of a solution flowing into said pump inlet, said concentration cell providing electrical signals in response to changes in concentration of liquids within the cell;
(e) a chemical additive tank communicating with said water flow between said check valve and said concentration cell;
(f) a concentration monitor connected to said concentration cell and having control means to generate output signals;
(g) valve means controlling flow of chemical additive from said chemical additive tank, said valve means acting in response to signals generated from said concentration monitor;
(h) sprinkler means communicating with said pump outlet.

12. The sprinkler of claim 11 wherein said pump outlet has a by-pass to by-pass solution from said pump outlet to the pump inlet at a point up-stream of said concentration cell.

13. The sprinkler of claim 11 wherein said chemical additive has a sufficient head at its point of introduction to said water flow to introduce said chemical into said water flow.

* * * * *